Feb. 13, 1940. W. SOLLER 2,189,843
TELEVISION SYSTEM
Filed Jan. 31, 1935 13 Sheets-Sheet 7
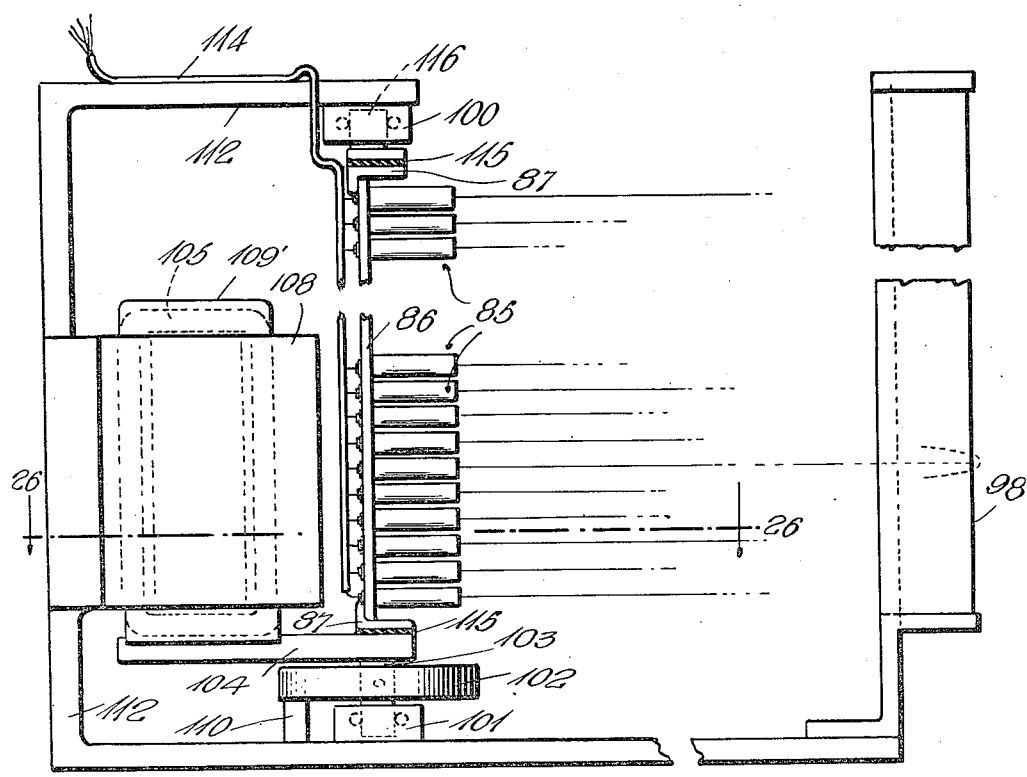
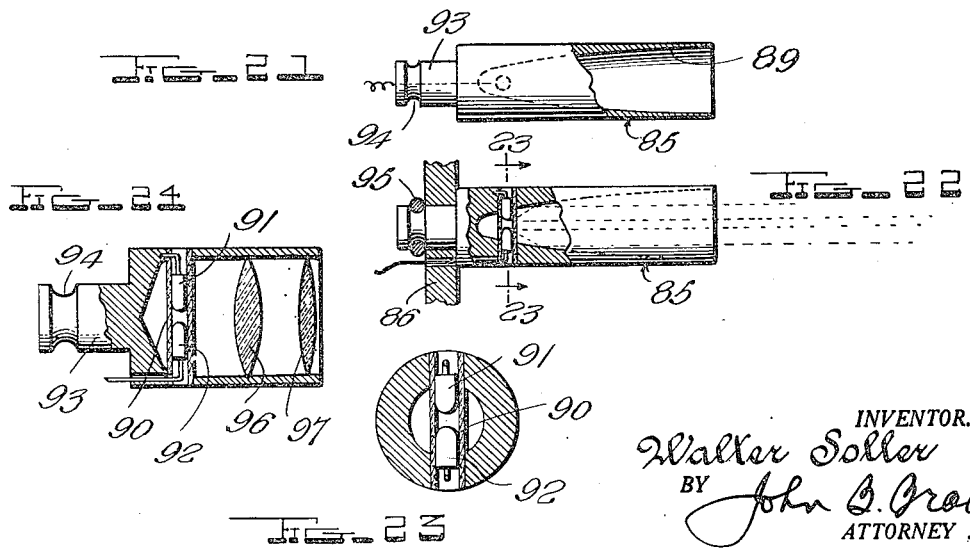
INVENTOR.
Walter Soller
BY John B. Orod
ATTORNEY Feb. 13, 1940.  W. SOLLER  2,189,843
TELEVISION SYSTEM
Filed Jan. 31, 1935   13 Sheets-Sheet 8
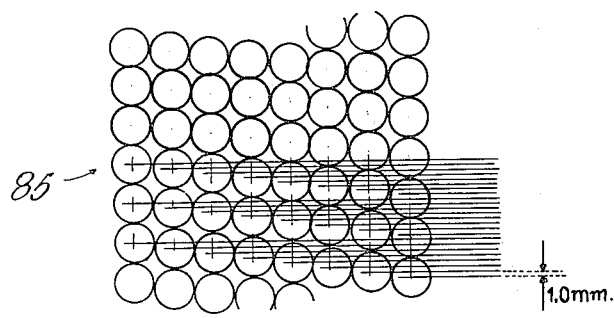
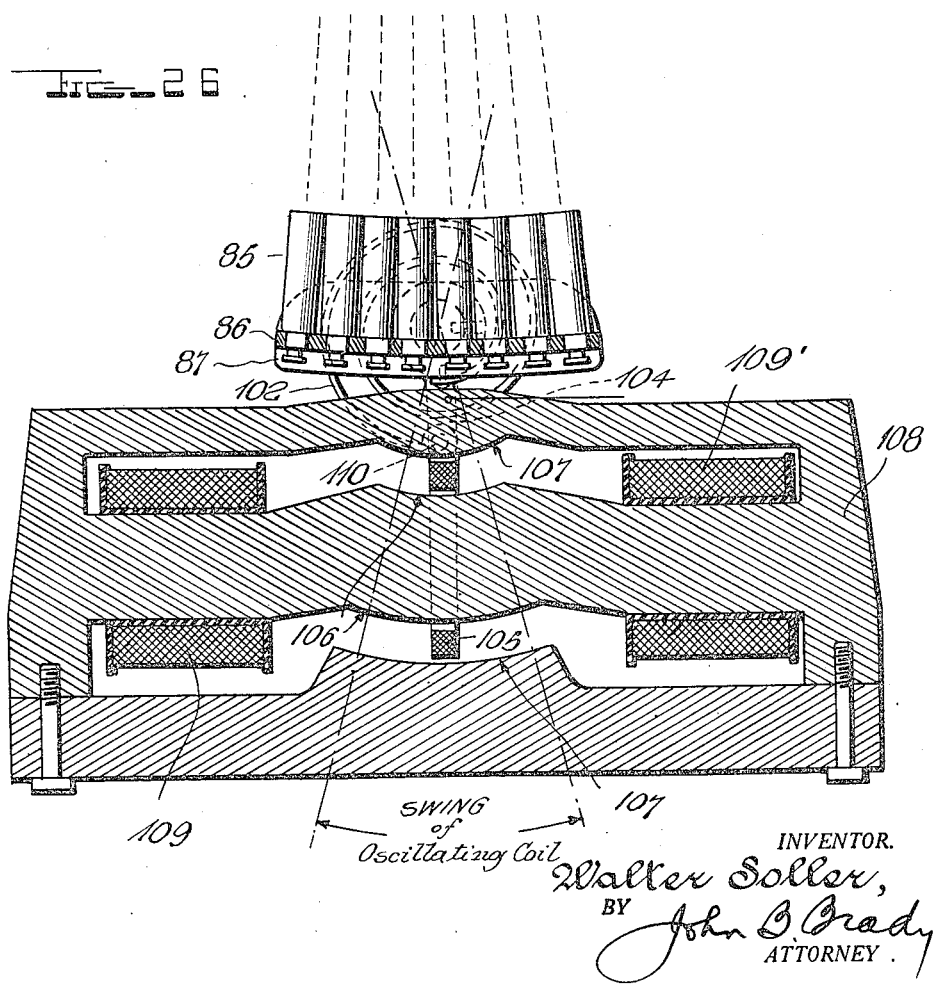
INVENTOR.
Walter Soller,
BY John B. Grady
ATTORNEY.

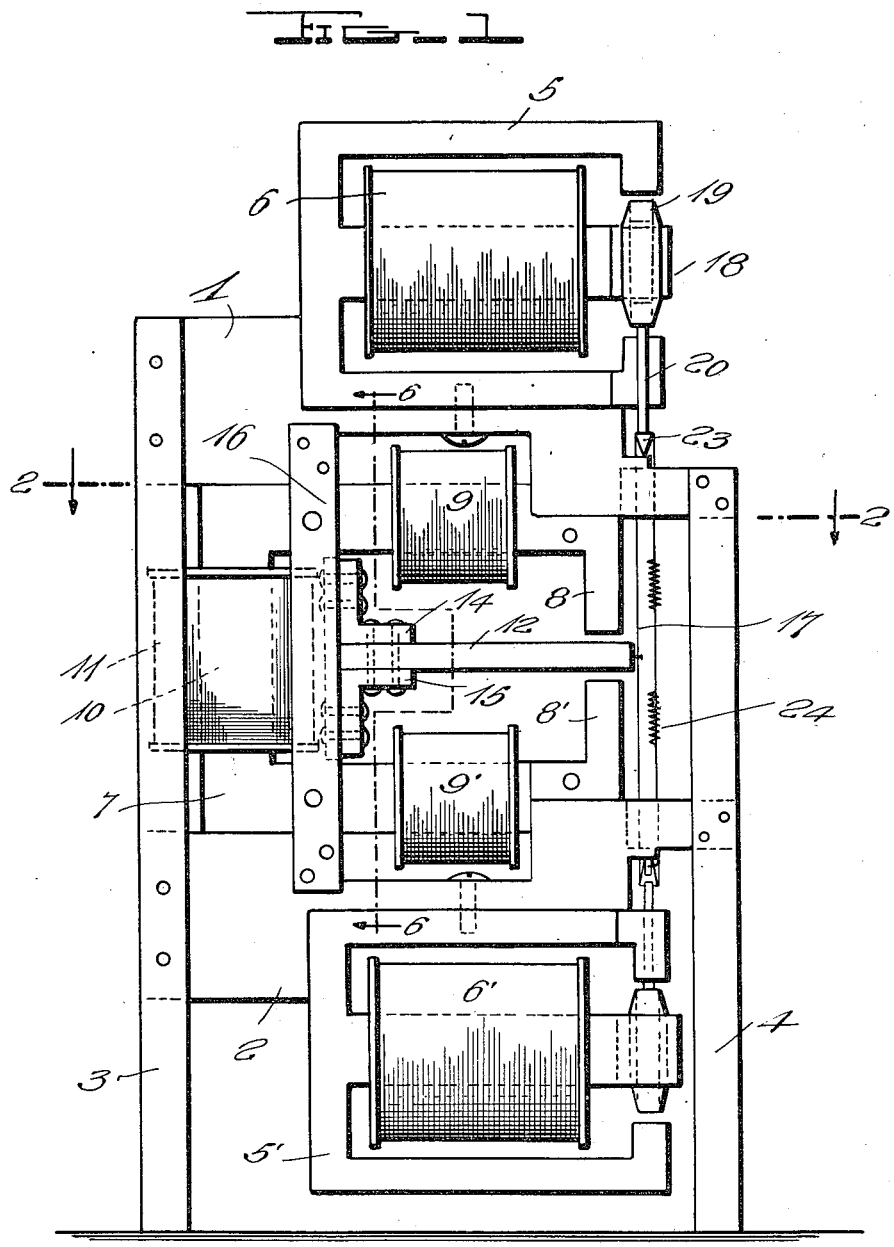

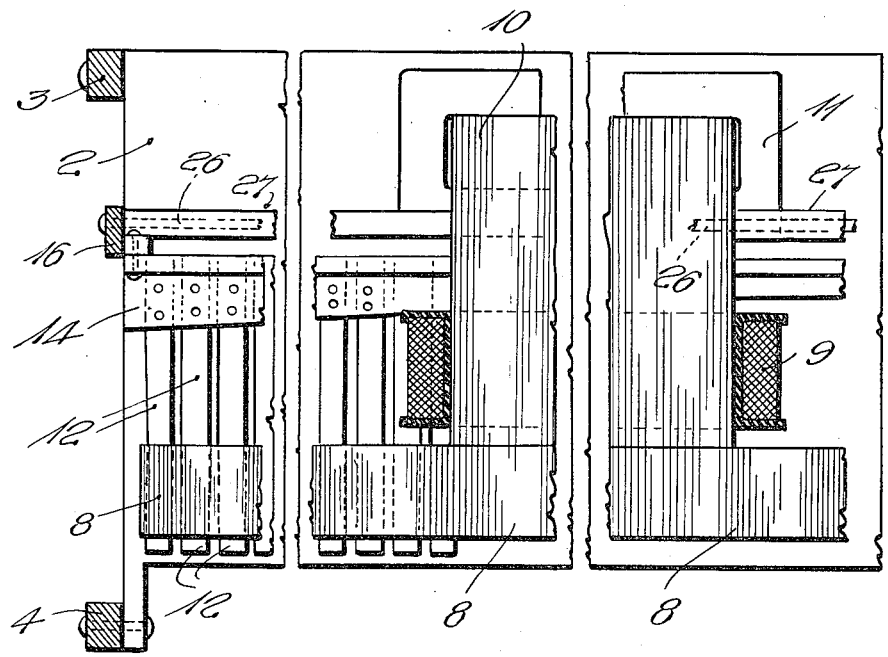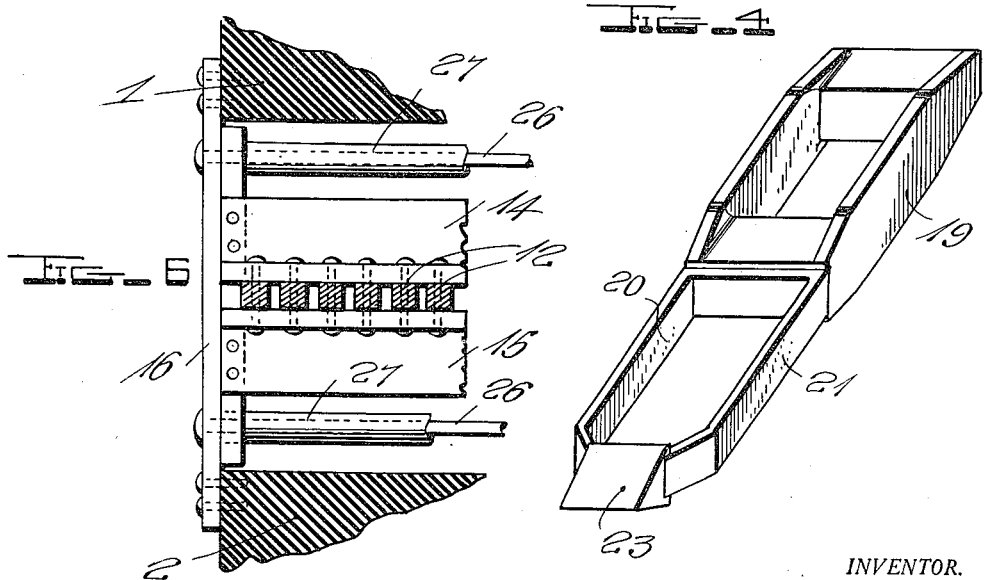

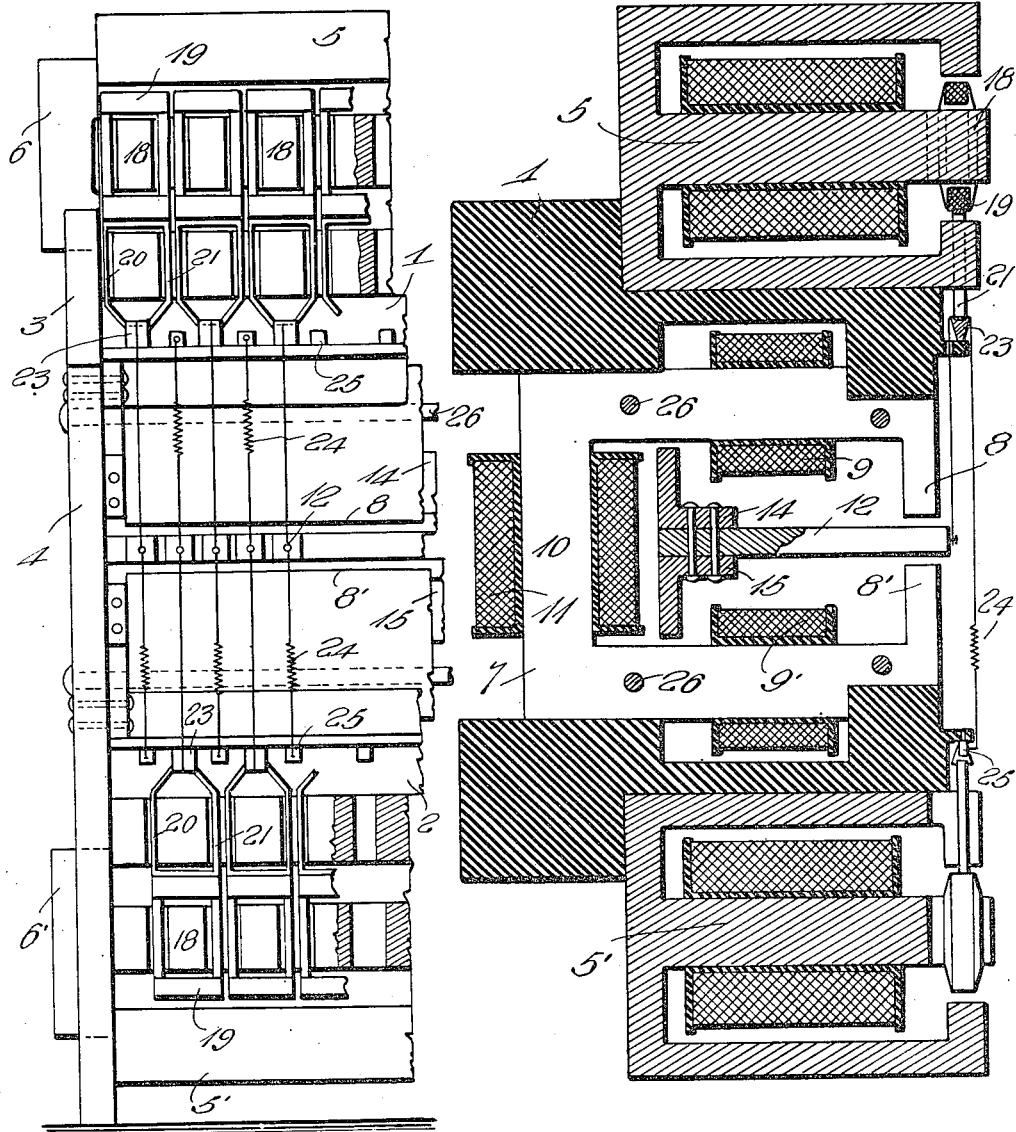

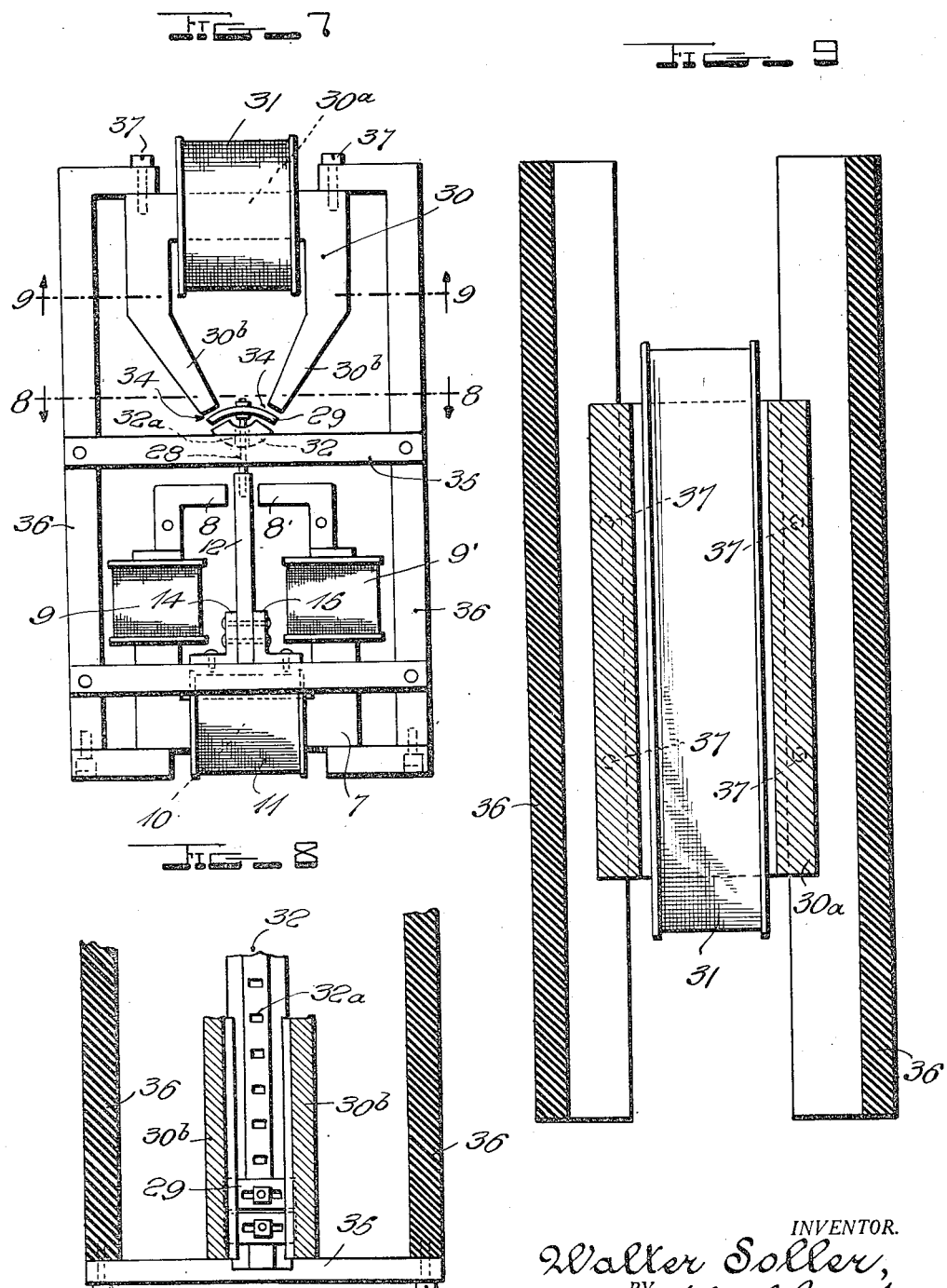

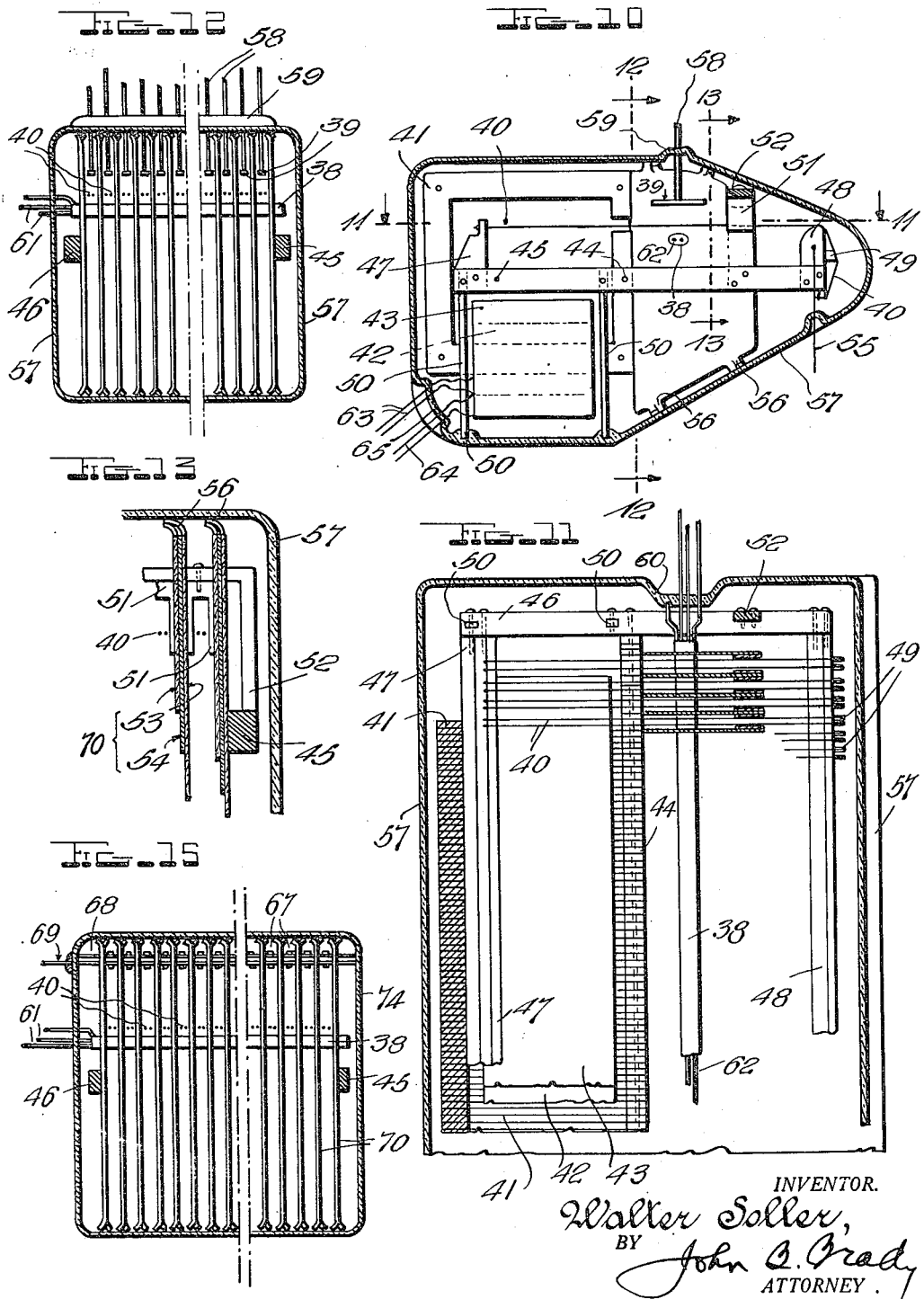

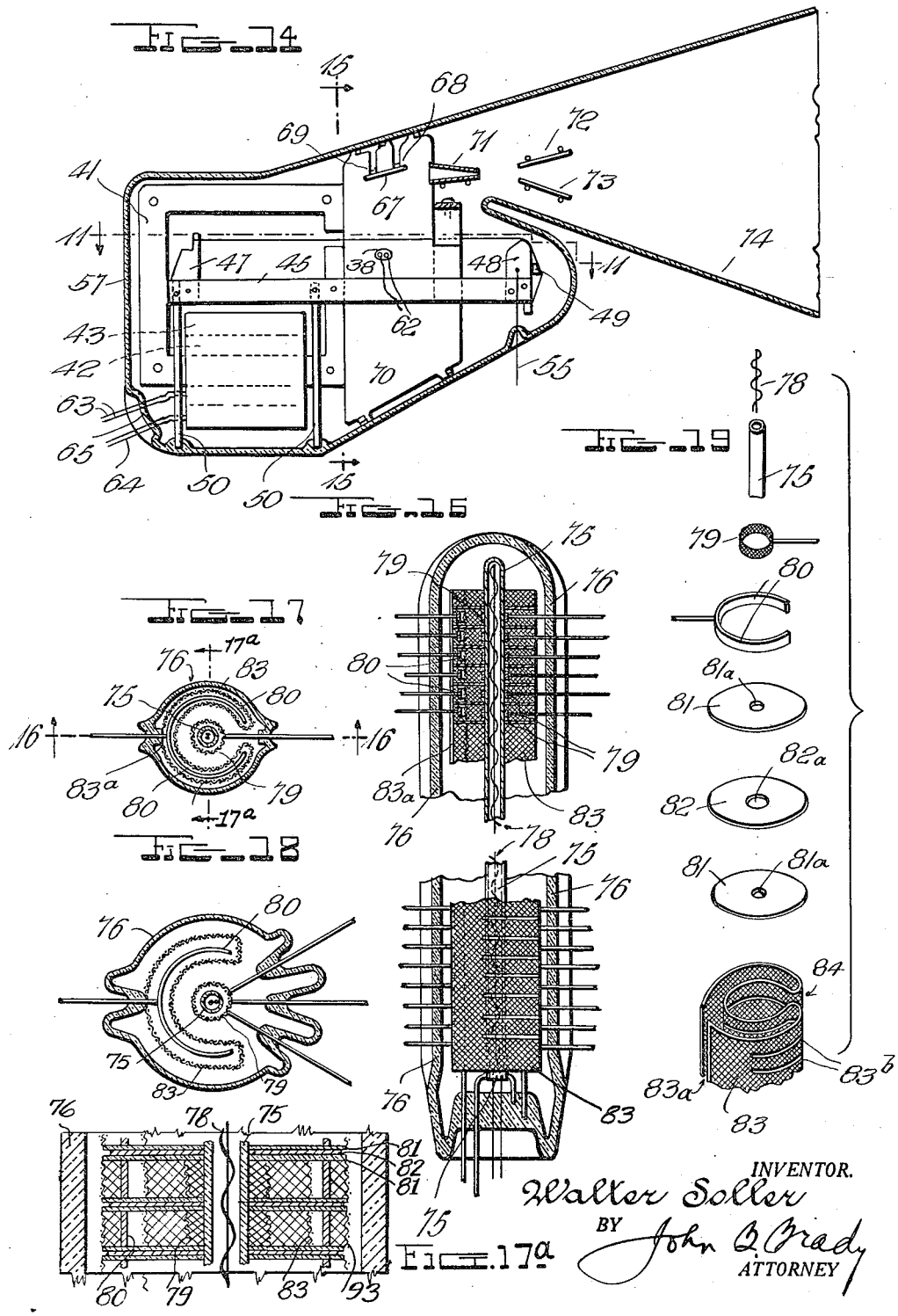

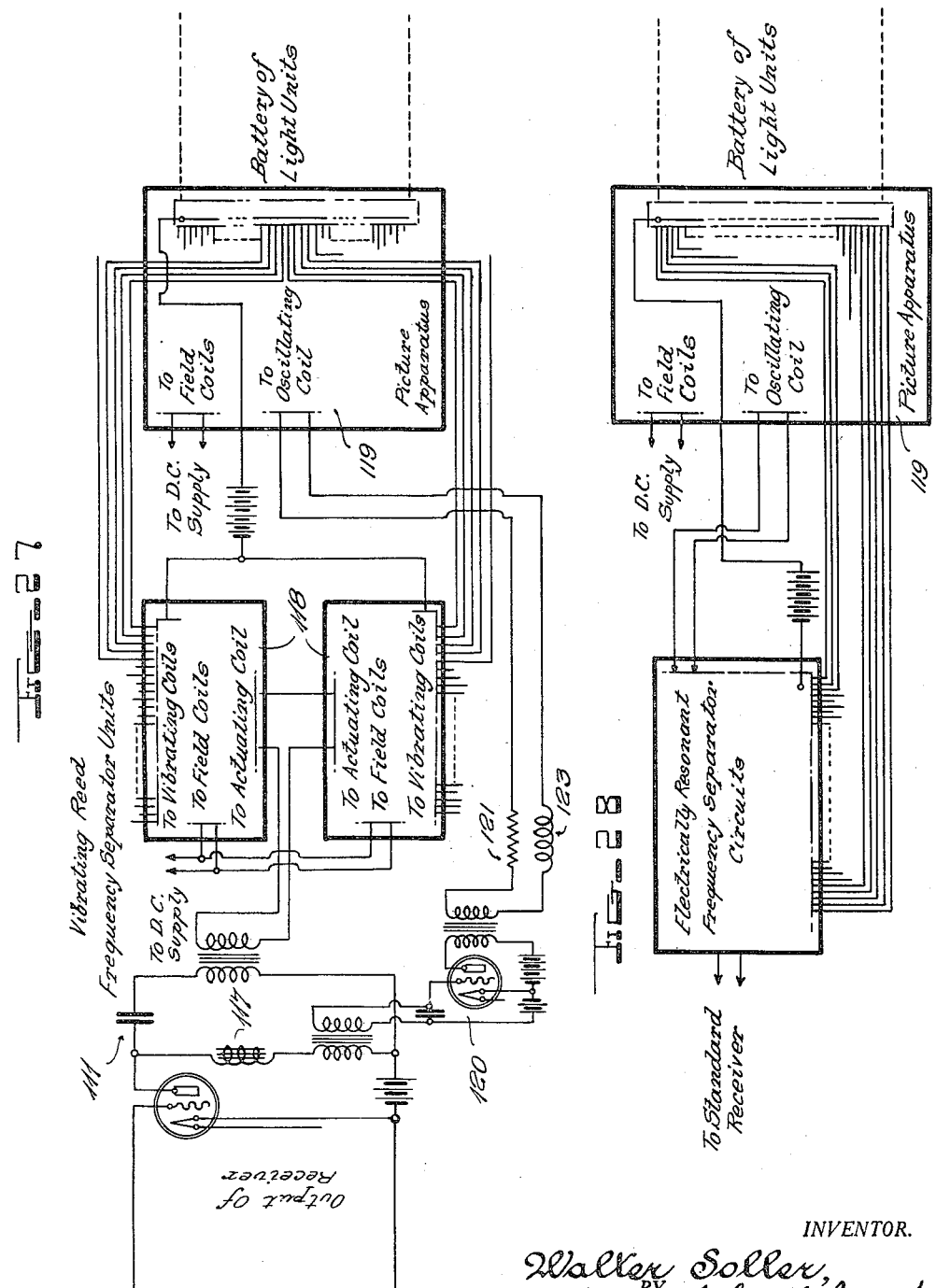

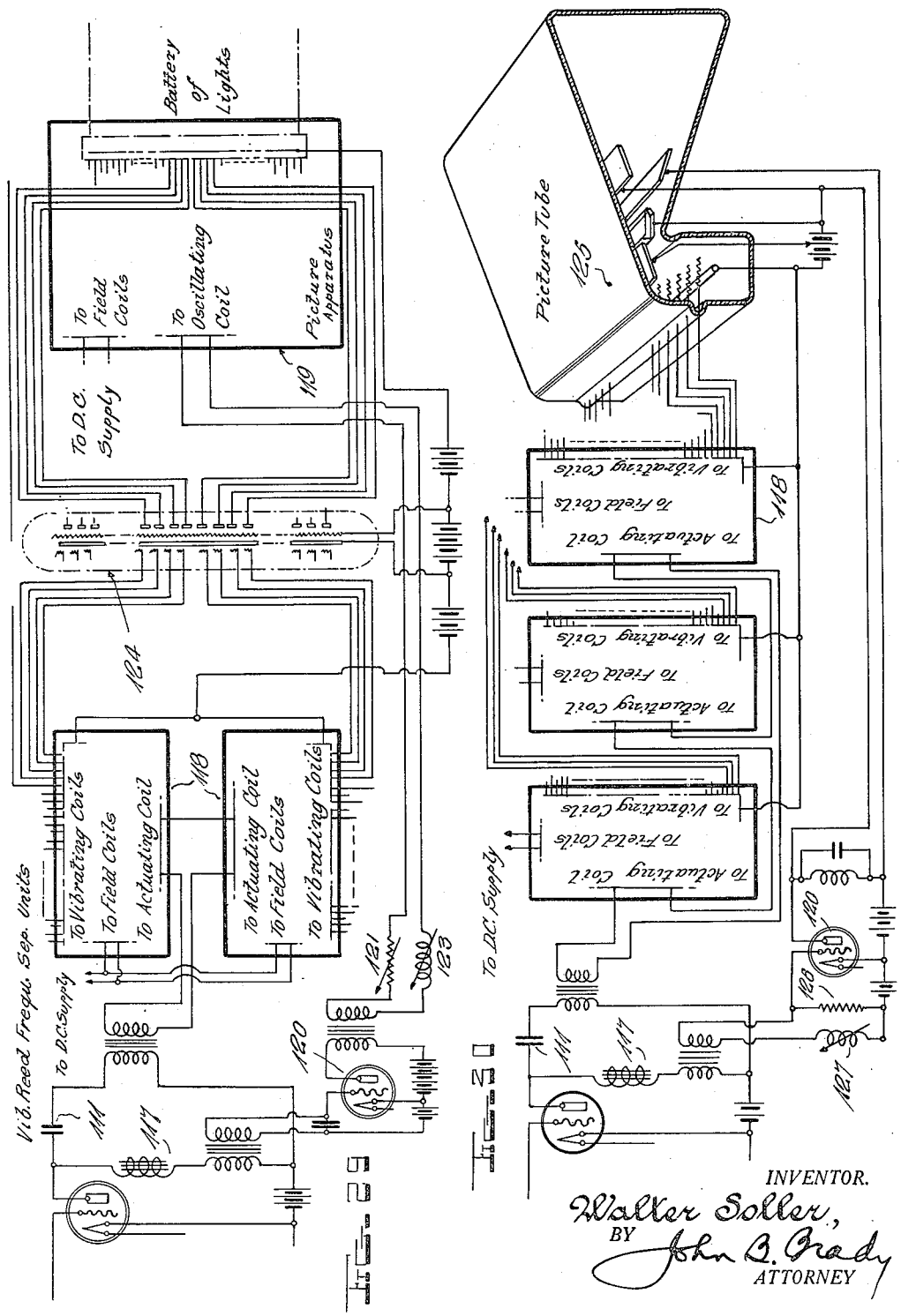

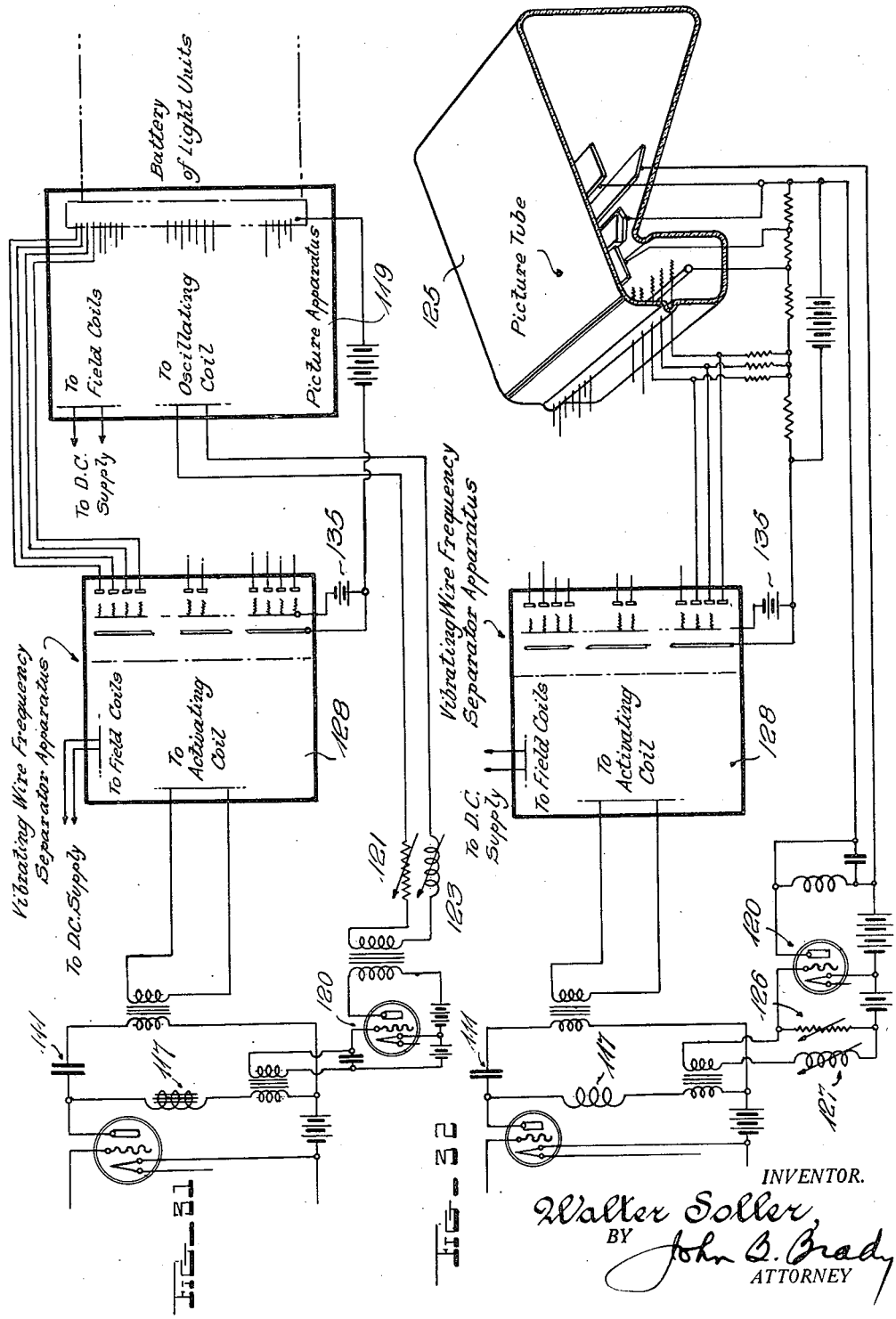

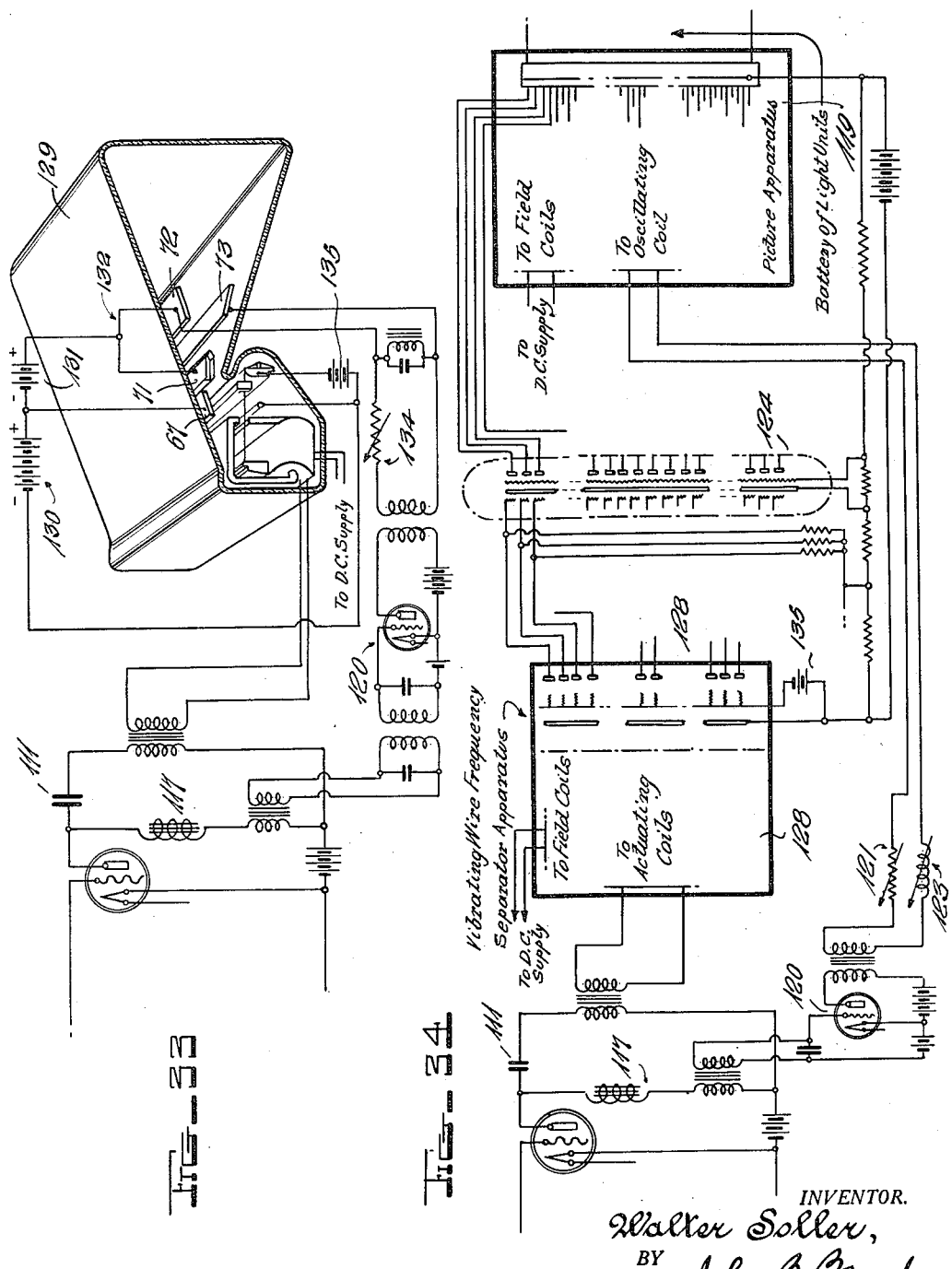

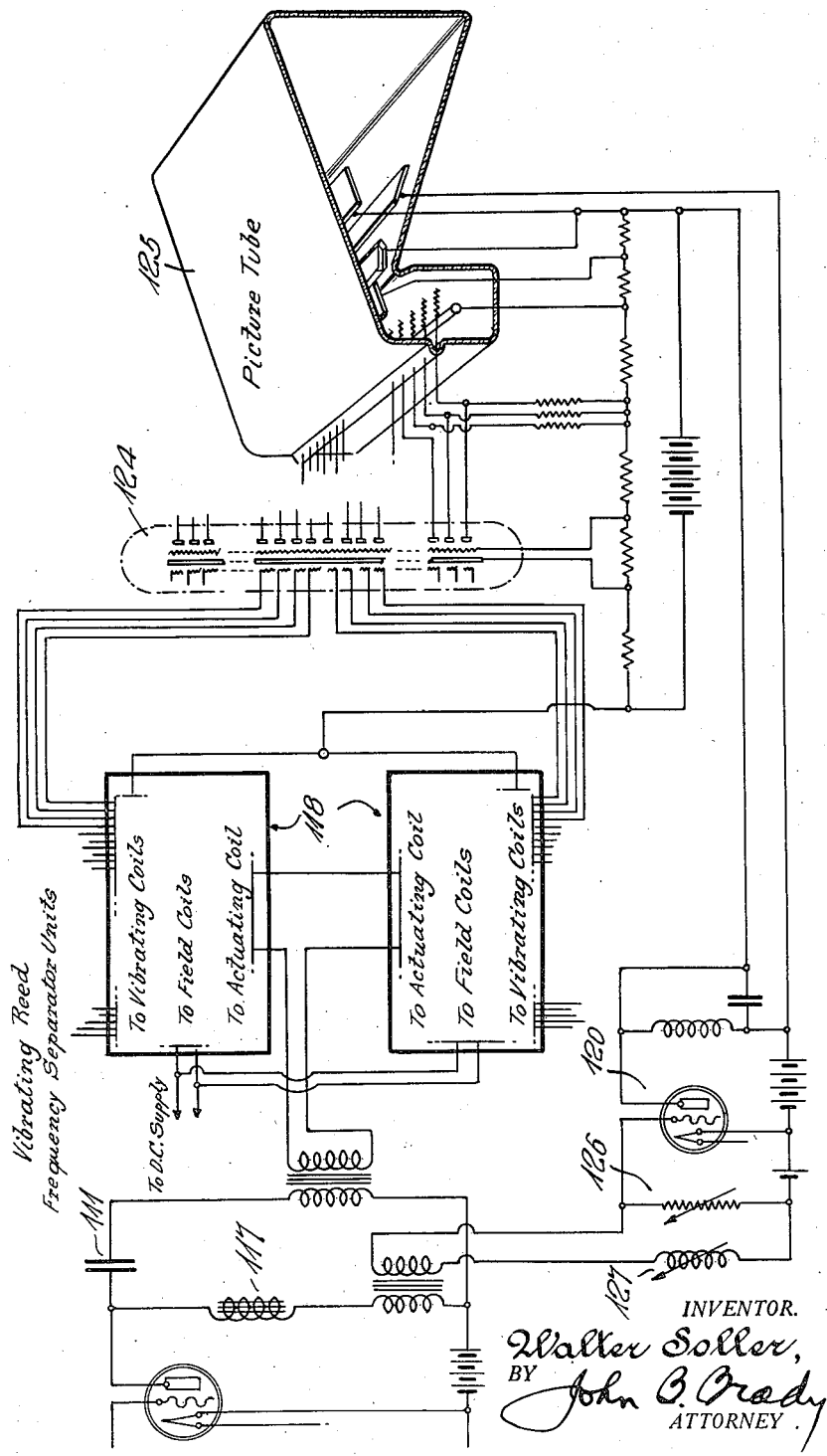

Patented Feb. 13, 1940

2,189,843

UNITED STATES PATENT OFFICE 2,189,843

TELEVISION SYSTEM

Walter Soller, Tucson, Ariz., assignor of one-half to William H. Woodin, Jr., Tucson, Ariz.

Application January 31, 1935, Serial No. 4,393

7 Claims. (Cl. 178—7.5)

My invention relates broadly to television systems and more particularly to television receiving systems and apparatus for the reproduction of television images.

This application is a continuation-in-part of my application, Serial Number 733,300, filed June 30, 1934, entitled Television system.

The apparatus of my invention may be employed in receiving systems arranged for translating a complex picture current, such as is produced in the television transmitting system described in my copending application Serial No. 733,300, filed June 30, 1934, into a reproduction of the object televised. The picture current produced in the television transmitting system of the said application Serial No. 733,300, comprises a plurality of light modulated currents of different frequencies, and an alternating current of a frequency proportional to the scanning frequency, combined and transmitted as a single complex current. The apparatus of my invention hereinafter described and claimed may be interchangeably employed or combined with the receiving apparatus described in my copending application Serial No. 733,300, to produce a stable, effective and practical television receiving system.

One of the objects of my invention is to provide frequency selector apparatus at a television receiver employing mechanically vibratible elements whereby the difference in frequency of the light modulated currents may be a minimum.

Another object of my invention is to provide a television reproducing apparatus employing reeds as the vibratible elements for separating the different frequency currents in the complex picture current received.

Still another object of my invention is to provide a television reproducing apparatus having tuned wires as the vibratible elements in the frequency separator portion of the apparatus.

A further object of my invention is to provide a television receiving apparatus which incorporates a multiplicity of mechanically vibratible frequency separating elements and means for translating the electrical energy into light energy to reproduce the object televised, in the same unit.

A still further object of my invention is to provide picture apparatus for producing an image on a screen, in which the apparatus comprises a plurality of light sources individually variable and focused on the screen.

Another object of my invention is to provide means for individually deflecting the multiplicity of light units in the picture apparatus in accordance with the scanning frequency in order to synthesize the complete image on the screen.

Still another object of my invention is to provide means at a television receiver for amplifying the separated different frequency currents.

A further object of my invention is to provide a construction of multiple element electron tube for the separate amplification of the modulated currents of different frequencies in a television receiver.

A still further object of my invention is to provide an arrangement of circuit elements in a television receiving system operative for selectively receiving, amplifying, and translating the complex picture current transmitted.

Another object of my invention is to provide a television receiving arrangement employing a vibrating reed frequency separator and a deflectable light control apparatus for integrating the picture elements and reproducing the television image.

Still another object of my invention is to provide a television receiving arrangement embodying the electrically resonant frequency separator circuits disclosed in my copending application, Serial No. 733,300, in combination with a deflectable light control apparatus for integrating the elements of the transmitted picture.

A further object of my invention is to provide a television receiving system including a vibrating reed frequency separating apparatus, a multiple element amplifying tube, and deflectable light control apparatus.

A still further object of my invention is to provide a television receiving arrangement including vibrating reed frequency separator units and a cathode ray picture tube for reproducing the television image.

Another object of my invention is to provide a television receiving system embodying a vibrating wire frequency separator, and deflectable light control apparatus for reproducing the television image.

Still another object of my invention is to provide a television receiving arrangement employing vibrating wire frequency separator apparatus and a cathode ray picture tube for reproducing the television image.

A further object of my invention is to provide a television receiving system employing vibrating wire frequency separating apparatus, a multiple element amplifying tube, and deflectable light control apparatus for integrating the picture elements.

A still further object of my invention is to provide a television receiving arrangement including vibrating reed frequency separator units, a multiple element amplifying tube, and a cathode ray picture tube for reproducing the television image.

A further object of my invention is to provide a television receiving system employing a combination vibrating wire frequency selector apparatus and cathode ray picture tube unit for reproducing a television image.

Other and further objects of my invention reside in the structure and arrangements of apparatus described more fully in the specification hereinafter following by reference to the accompanying drawings, in which:

Figure 1 is an end view of one form of vibrating reed frequency separator apparatus of my invention; Fig. 2 is a horizontal sectional view on line 2—2 in Fig. 1; Fig. 3 is a partial front elevation of the apparatus shown in Fig. 1; Fig. 4 is a perspective view of a coil unit employed in the assembly shown in Figs. 1-3; Fig. 5 is a vertical cross-sectional view of the apparatus shown in Figs. 1-3; Fig. 6 is a detail sectional view taken on line 6—6 of Fig. 1.

Fig. 7 is an end view of a modified form of vibrating reed frequency separator apparatus of my invention; Fig. 8 is a partial horizontal sectional view taken on line 8—8 in Fig. 7; Fig. 9 is a horizontal sectional view taken on line 9—9 of Fig. 7.

Fig. 10 is a side view partially in section of a form of vibrating wire frequency separator apparatus of my invention; Fig. 11 is a partial horizontal sectional view taken on line 11—11 of Fig. 10 or Fig. 14; Fig. 12 is a foreshortened vertical longitudinal sectional view taken on line 12—12 of Fig. 10; Fig. 13 is an enlarged detail view taken on line 13—13 of Fig. 10.

Fig. 14 is a side view partially in section of a combined vibrating wire frequency separator apparatus and cathode ray picture tube of my invention; Fig. 15 is a foreshortened vertical sectional view taken on line 15—15 in Fig. 14.

Fig. 16 is a vertical sectional view through a multiple unit, multiple electrode electron tube of my invention; Fig. 17 is a horizontal cross-sectional view of the electron tube shown in Fig. 16; Fig. 17a is a partial vertical sectional line on an enlarged scale, taken on line 17a—17a in Fig. 17; Fig. 18 is a cross-sectional view showing a modified construction; Fig. 19 is a perspective view of the elements of the multiple electron tube of my invention in disassembled relation.

Fig. 20 is a side elevational view of a preferred construction of picture producing apparatus of my invention; Figs. 21, 22 and 23 are plan, side elevation and cross-sectional views, respectively, of a preferred form of light unit employed in the picture producing apparatus shown in Fig. 20; Fig. 24 is a side elevation of a modified form of light unit of my invention; Fig. 25 is a partial front view of the battery of light units mounted in the picture apparatus shown in Fig. 20; Fig. 26 is a horizontal sectional view taken on line 26—26 of Fig. 20; and Figs. 27–35 are schematic diagrams showing a number of modified forms of receiving systems of my invention employing apparatus of my invention.

The signal current issuing from the type of transmitter with which the systems hereinafter described are adapted to cooperate, may comprise a radio frequency carrier modulated by a complex low frequency wave which includes a component representing the scanning rate and having a frequency between 10 and 60 cycles per second, and a plurality of components representing the varying light intensities in definite portions of the scanned image and having individual frequencies within the range, for example, of 2500 to 5000 cycles per second. The plurality of components having frequencies within the given range are themselves modulated by the varying light intensities in the image scanned. The operation then of a receiving system utilizing such a wave is first to rectify the modulated radio frequency carrier, if any, to detect the complex low frequency modulating wave. Secondly, the component representing the scanning rate is selected from the complex wave; and thirdly, the light modulated components, in what may be called the complex picture current, are separated by virtue of their individual frequencies, and rectified in order to detect the modulations thereof which are employed in cooperation with the component representing the scanning rate, in suitable apparatus for reproducing the image transmitted.

Both the transmitting and receiving systems used with this television system have a separate audio frequency for each line of the picture. A scanning frequency of 10 cycles produces 20 pictures a second. The audio-frequencies of the individual lines determine the fineness of structure of the lines. For the example indicated above considering 20 pictures per second, this would give a structure of $$\frac{2500}{20} \times 2 = 250$$

equivalent lines for the coarsest structure and 500 equivalent lines for the finest structure. The factor 2 in this equation is put in to take care of the fact that both the negative and positive half of the cycles in these receiving systems give an intensity indication.

My copending application, Serial No. 733,300, filed June 30, 1934, for Television system, discloses a complete transmitting and receiving system; this application, which is a continuation-in-part thereof, shows additional receiving systems and apparatus of my invention devised for cooperation with transmitting systems of the type shown in my copending application.

One of the principal advantages of the apparatus of my invention is that it requires only very narrow bands of frequency in transmission of television signal energy either by wire or space radio. Instead of the method of separating the light modulated frequencies at the receiving end by electrical resonant circuits, as in my copending application Serial No. 733,300, I may employ either of two additional methods of mechanical resonance: (a) vibrating reed system, as shown in Figs. 1-9; or (b) vibrating wire system, as shown in Figs. 10-15. The reeds employed are of hard magnetized steel, and ich varies in size and weight so that each has a different natural frequency of vibration. These frequencies may be in the range of 500 to 1000 cycles per second, and five hundred reeds may be used. The alternator at the transmitter would, of course, be designed to generate voltage at these frequencies, and the different channels in the transmitter and receiver initially connected in the proper sequence.

Fastened to the ends of the reeds, as shown in Figs. 7–9, are small coils of fine wire which have voltages induced in them when they vibrate in a magnetic field. The voltages induced in the opposite sides of the coils are of such sign that they add. In another arrangement shown in Figs. 1–6, the coils are not mounted directly on the reeds, but are vibrated by means of wire, pivot, and lever arm mechanisms. The object of this last arrangement is to increase the amplitudes of the oscillations of the coils and thereby obtain increased voltages.

The reeds which are similar to halves of tuning forks (that is, each reed is similar to one arm of a tuning fork) are mounted between the poles of a laminated core and are caused to vibrate by the fluctuating magnetic fields produced in the core by the amplified "picture current" which, in its complex form is passed through the main coil of the vibrating reed magnet. A magnetic field fluctuating in a complex manner due to the combination of modulated different frequency currents in the main coil is thus produced. The reeds can, however, vibrate only at their natural frequencies. They will, therefore, individually respond only to that frequency in the complex magnetic field which corresponds to the individual natural frequency. Each reed will instantly follow the amplitude changes of its resonant magnetic field, since the induced voltage and resulting current in the vibrating coil produce damping, and the induced voltage will vary in accordance with the light modulations.

The coils on the vibrating reed magnet which are energized by direct current are employed to increase the constant magnetization of the core to that value at which the complex picture current in the main coil will produce a maximum change in magnetization. The reeds are rigid vibrating systems and are, therefore, much more selective than electrical resonant circuits. This arrangement thereby makes it possible to use low light modulated frequencies and thus narrow the frequency band required. In the method of transmission by radio frequency carrier, the channel adjacent the carrier frequency is greatly reduced by this arrangement, a channel only one kilocycle in width being entirely practicable.

The electromagnet employed to produce the induction field for the vibrating coils is designed to produce an intense magnetic field so that sufficiently large voltages are induced in the coils. The core of the vibrating reed magnet must be laminated. The direction of lamination is as shown in the drawings, parallel to the path of vibration of the reeds. In order that the main coil and the field coils may be limited to a reasonable size, the cores are shaped, as shown in Figs. 2 and 9, and the length of the pole of the vibrating reed magnet is limited to embrace a definite number of vibrating coils. Several such units can be used to take care of the required number of coils and reeds, one reed and one coil being required for every line of the television picture. These units, therefore, operate to separate the complex television signal energy into its component frequencies and generate variable single frequency voltages at the terminals of the vibrating coils, one such voltage for each line of the ultimate picture.

The vibrating wire system similarly employs an electromagnet having a main coil through which the complex picture current is conducted, producing a complex magnetic field which acts on pairs of stretched wires causing them to vibrate at the individual frequencies to which they are tuned. A pair of wires tuned respectively to each frequency in the complex picture current is provided. Each pair of wires is placed so that it serves as a space charge control grid in a multiple plate-multiple grid electron tube. Each pair of wires is enabled, thereby, to control the current to one of the plate electrodes in accordance with the amplitude of vibration.

A coil energized by direct current and serving the same purposes as the direct current energized coils on the vibrating reed magnet, is wound over the main coil. The pairs of wires are stretched on a frame in position between the poles of the electromagnet. Wedges are provided for tuning the wires, and solder is applied at the wedges when the unit is in tune. The frame is shaped to allow for different vibrating lengths of wire for the different frequencies. The plates are mounted in the glass in the usual manner. The magnet frame and vibrating wire structure are fastened together and rigidly supported in glass at the bottom; this forms the main structure of the tube. Then the compartment partitions, constructed of mica and metal, the cathode, and the plates sealed in glass, are fitted in, and a glass shell finally sealed over the assembly.

All of the vibrating wires have metallic contact with the frame, so that a short circuit current is obtained to produce damping. This damping will enable the vibrations to follow the changes in amplitude of the different frequency currents. Since all the vibrating wire grids have metallic contact with the frame, the source of common grid bias may be connected to the frame. This apparatus operates on the principle that the amplification factor of an electron tube varies with the position of a charged grid with respect to the cathode and anode electrodes, and the anode current varies directly with the amplification factor. Therefore, the anode currents vary with the vibrations of the vibrating wire grids in the apparatus of my invention, and the apparatus is capable of separating the complex picture current into single frequency currents in the plate circuits. Such currents may be employed subsequently to variably energize a light source or to control the operation of a cathode ray picture tube.

The multiple plate-multiple control grid vacuum tube, shown in Figs. 16–19, permits amplification of the separated frequency currents, if necessary. The tube shown includes a screen grid electrode and is the preferred type because of the large amplification factor characteristic of that type. And as only one screen grid is required for all the anode and grid electrodes, the structure is not complicated by the addition thereof. Fig. 18 shows a modified construction of the tube in which the terminals of adjacent grid electrodes are angularly displaced in order to reduce the capacity between the connections.

One advantage of the multiple unit vacuum tube is that its use eliminates the necessity of developing large voltages in the vibrating coils of the reed units. Reed units with smaller reeds and coils can be used with these multiple tubes with the net result of less expensive receiving equipment.

The apparatus shown in Figs. 20–26 employs a bank of gas glow lamps of the neon tube type. To distinguish it from the cathode ray picture tube described in my copending application Serial No. 733,300, I define this as "picture producing apparatus." The glow lamps are of small bore glass tubing with an electrode on each end and gas sealed within. The operation is similar to that of a neon lamp in which the gas is rendered luminous by an electric voltage on the electrodes. Other than neon gas may be employed and I shall, therefore, hereinafter refer to the glow lamps as ionized gas tubes. Either of the two forms of light units described may be employed. The light given off by either of the units can be focused on a screen as a spot of 1 mm. diameter. The first makes use of the property of an elliptical mirror by which a light source placed at one of its foci is focused at the conjugate focus. A mirror such as that shown in the drawings will focus all but 1/143 part of the light at the conjugate focus, while one ¼ inch longer will focus all but 1/256 part of the light.

The second form employs two lenses, the first of which forms a parallel beam of light rays from the light placed at its focus, while the second focuses this parallel beam into a 1 mm. spot on the screen. The light units are arranged in an arc so that the lights, when glowing, illuminate a 1 mm. wide line on the screen. The arrangement of the bank of lights to accomplish this is shown in Fig. 25. The vertical spacing of the centers of the light units must be 1 mm., if 1 mm. diameter spots are projected and 1 mm. wide lines are desired for the picture. The horizontal spacing is, at the minimum, equal to the width of a light unit. As many light units are placed in a row as the number of times the vertical spacing is divisible into the horizontal spacing; thus for light units 1 cm. in diameter, ten units must be mounted in a row, the eleventh being mounted immediately above the first. The bank contains one lamp for every modulated carrier frequency. The lamp bank is caused to oscillate on a vertical axis at the scanning frequency as determined by the frequency of the synchronous motor of the camera at the transmitter. With this oscillation, the luminous vertical line constantly traverses the screen, each of the glow lamps changing in light intensity with the variations in the intensity of the light on the corresponding strip in the photosensitive retina of the camera, thus producing the picture on the screen.

The light bank supporting frame is insulated from the rest of the apparatus and forms a common terminal for all the light units. From each light unit, one insulated wire is brought out from one of its terminals. When sufficient voltage is applied to a glow lamp to start its operation, a very small increase in voltage produces a large increase in luminosity. Sufficient voltage to start the operation is, therefore, connected to the light bank supporting frame terminal of the circuit and serves as a common bias for all the glow lamps. This voltage is shown as obtained from a battery when the apparatus is used directly with the vibrating reed units. When amplifying tubes are used, however, the "B" supply for the anode of the tube provides this voltage.

The light band supporting frame carrying the light bank is caused to oscillate by the reaction between the magnetic field produced by the deflection current in flowing through a coil mounted on the light bank supporting frame and a stationary magnetic field. The magnetic fields are arranged so that the force on each side of the coil produces a torque in the same direction. The light bank supporting frame is mounted top and bottom in ball bearings. A flat spiral spring is attached to this movable frame and the main frame of the apparatus in such a way as to form a torsion pendulum. The moment of inertia of the movable system and the torque of the spring are such that the system has a natural frequency corresponding to the scanning frequency of the camera at the transmitter. A minimum current is, therefore, required to keep the light in oscillation. A special resonant circuit to filter the scanning current from the picture currents is not necessary, as this pendulum arrangement in itself is a very selective mechanical filter.

A number of receiving systems may be set up employing the apparatus of my invention herein described. Figs. 27-35 schematically illustrate some of the more feasible arrangements, all of which are practical, uncomplicated systems.

The oscillation current, the synchronous motor current at the transmitter, may be from 10 to 60 cycles, giving an exposure of 20 to 120 views each second, and the frequency of the carrier currents for pictures up to 500 lines can lie within a range of from 501 to 1000 cycles with no harmonic interference in the reed separators. For 1000 line pictures, the 1001 to 2000 cycle band of carrier currents can be used. This higher band can be used with fewer lines per picture if desired. Both the transmission system and the receiving system, as described in my copending application Serial No. 733,300, and in the foregoing specification, can accommodate 1000 or more lines per picture. The photosensitive retina of the camera can be built of alternate layers of metal and insulation sheets of .003 and .001 inch thickness, respectively. The edge of the metal being photosensitive would make the retina only four inches square for a 1000 line picture. This construction is entirely practicable. Likewise, the construction of the picture apparatus, as shown in Figs. 20-26, makes a 1000 line picture 1 meter square. Neither the transmission nor receiving end is limited to 1000 line pictures, but both can be enlarged without any change in method.

The large difference in frequency between the frequency of the oscillating or scanning current and the frequencies of the light modulated carrier currents allows the simple expedient of a low frequency impedance path and a higher frequency impedance path to separate the scanning current to within 1 percent which is entirely adequate, as both the reeds or wires of the frequency separator and the torsion pendulum of the picture apparatus, are very selective.

The picture apparatus can be adapted for auditorium use, since it actually projects a picture on a screen, by using larger light units. The equipment in this use may be mounted behind the screen or in front of the screen, but should be optically arranged to produce a larger picture.

Fig. 33 shows the simplest receiver unit, in that only the special picture tube is required. This unit incorporates the frequency separator shown in Figs. 10-13 and the cathode ray picture tube, as shown more clearly in Figs. 14 and 15; that is, in place of the grids of the ordinary picture tube, the vibrating wires are substituted, but all the features of cut-off grid bias and secondary electron emission of the cathode ray picture tube, fully set forth in my copending application Ser. No. 733,300, are retained.

Referring to the drawings in more detail, Fig. 1 is an end view of the structure of one form of the vibrating reed assembly of my invention which comprises a pair of longitudinally extending structural members, designated by reference characters 1 and 2, supported at each end by pairs of legs, 3 and 4. Structural member 1 is supported at the upper end of legs 3 and 4, and the structural member 2 is supported below member 1 and spaced therefrom. On the upper surface of member 1 is fixed a solid core structure 5 having a winding 6 mounted on the central leg thereof. A similar core structure 5' and similar winding 6' are mounted below the lower structural member 2 in a similar manner.

Between structural members 1 and 2 is mounted a laminated core structure 7 having pole pieces 8 and 8' extending the entire length of the assembly. Field coils 9 and 9' are mounted on opposite arms of the core structure 7. Yoke section 10 of the laminated core 7, on which the main coil 11 is mounted, and the arm sections on which field coils 9 and 9' are mounted, do not extend the entire length of the apparatus, as may be seen by reference to Fig. 2 which is a horizontal sectional view of the assembly taken on line 2—2 of Fig. 1. This permits smaller sizes of coils to be used, thus improving the electrical design of the apparatus. Between the pole pieces 8 and 8' are arranged a series of magnetized steel reeds, designated generally by reference character 12. These reeds are mounted adjacent the yoke of core 7 between a pair of angle bars 14 and 15, which, in turn, are supported at both ends on strips 16 fixed to the structural members 1 and 2. These angle bars have the edge of the surface adjacent the reeds 12 tapered slightly thus permitting different length of different reeds to vibrate. Due to these differences in lengths, each reed will vibrate at a slightly different natural frequency. The edges of the angle bars 14 and 15 may be made straight, if preferred, and the differences in the natural frequencies of vibration of the reeds 12 effected by having the lengths thereof, measured out from the angle bars, different.

Fastened to the outer extremity of each of the vibrating reeds is a wire thread 17. Referring again to the solid core structure 5 and the corresponding core 5', the outer ends of the central legs of these core structures are slotted, as will be seen more clearly by reference to Fig. 3, which is a partial front elevation of the apparatus. With the teeth 18 formed by these slots as core elements, coils are mounted for vibratory movement with respect to the cores. These coils, generally designated by reference character 19, are supported by arms 20 and 21 fixed to one of the short sides of the coil 19. The ends of arms 20 and 21 are connected to a wedge shaped member 23 on the small rectangular face thereof, the edge of the wedge member opposite from the connection of the arms 20 and 21 bears on a portion of the frame structure. This coil assembly is shown in more detail in Fig. 4 which is a perspective view thereof. Fig. 4 also shows the manner in which the coil is flattened on the longer sides thereof in order that the space occupied by each coil may be maintained at a minimum. The wire thread 17, fastened at one end to the vibrating reed 12, passes over, and is fixed to, the rear side of the wedge on which the coil 19 pivots on one supporting member. The thread then extends vertically to the opposite supporting member and is secured thereto at 25. A coil spring 24 is interposed in the thread and serves to maintain the coil 19 in position on its pivot.

Fig. 5 is a vertical cross-sectional view of the vibrating reed assembly. Fig. 6 is a detailed sectional view taken on line 6—6 of Fig. 1 and shows the manner of mounting the angle bars 14 and 15 on a supporting member 16 which, in turn, is mounted on structural members 1 and 2. Fig. 6, together with Fig. 2, shows the manner of mounting the laminated core 7 by bolt member 26 and spacing collar members 27. This construction rigidly spaces the foreshortened yoke portion 10 with respect to the ends of the assembled structure.

Fig. 7 is an end view of a modified form of vibrating reed apparatus in which the vibrating coil is mounted directly upon the vibrating reed. The laminated core structure 7 and the location of the vibrating reeds 12, with respect thereto, are the same as described in connection with Fig. 1. Instead of the wire thread 17 connected with the free end of the vibrating reed, a nonmagnetic rod 28 is mounted vertically therein and carries on the other end thereof the vibrating coil 29 of a somewhat different form. A modified form of field magnet also is provided. This consists of core member 30 having a yoke portion 30a which carries the energizing winding 31. This yoke portion is foreshortened in order to decrease the size of the coil required. Pole pieces 30b extend the entire length of the apparatus and with auxiliary member 32 provide air gaps 34 within which the vibrating coil 29 oscillates. Auxiliary member 32 is apertured at 32a regularly along its length in order to permit the nonmagnetic supporting rod 28 to pass through and to vibrate therein. This auxiliary pole piece 32 is supported at either end on cross-bars 35 fixed to the vertical structural members 36. Care must be taken that the combined gap between the pole pieces 30b of the core and the auxiliary pole piece 32 is smaller than the distance between the two pole pieces 30b to insure that the field lies across the gaps and is not "short-circuited" across the pole pieces 30b of the core.

Fig. 8 is a horizontal sectional view taken on line 8—8 of Fig. 7 and indicates that the pole pieces 30b extend the entire length of the structure. Fig. 9 is a horizontal sectional view taken on line 9—9 of Fig. 7, looking upwardly, and shows the foreshortened yoke section 30a and the winding 31 thereon. The core 31 of the field magnet is secured to the structural members 36 by means of bolts 37.

Fig. 10 is an end view, partially in section, of a vibrating wire frequency selector apparatus of my invention. This is an electron tube system employing a common heated cathode electrode 38, a plurality of anode electrodes, generally designated by reference character 39, and a multiplicity of control elements. The control elements comprise a series of magnetic vibrating wires, 40, tuned in pairs for different frequencies of vibration and selectively vibrated under control of a fluctuating complex magnetic field produced across the poles of a laminated core 41 by the signal current flowing in a winding 42 mounted on the core 41. A field winding 43, disposed over the main winding 42, is energized by direct current and serves to magnetize the core 41 to its most sensitive condition, at which small changes in magnetomotive force produced in the main winding by the signal current will produce maximum change in the strength of the magnetic field. Connections to these windings are made through conductors 63 and 64, respectively, which are sealed in the glass press 65 forming part of the shell 57 which envelops the apparatus.

Horizontally extending structural members 45 and 46 secured at either end of the core 41 by long bolt 44, serve as general supporting means. Between the ends of members 45 and 46, bars 47 and 48 are secured, which bars are adapted to receive the ends of the vibrating wires 40. Wedges 49 are provided as tuning means and one is placed beneath each of the wires 40 and against the bar 48 in such a manner that vertical movement of the wedge will alter the tension on the wire. When the correct tension is obtained, the wire is soldered to the wedge to maintain the desired condition. Connection is made to the bar 48 through conductor 55 in order that a common bias potential may be had on the vibrating wire grids.

Supporting legs 50 are fixed at one end in the members 45 and 46 and sealed at the other ends in glass for supporting the core 41 and the vibrating wire structure in position. A series of damping magnets 51 are supported from the transverse bar 52 mounted at either end in the members 45 and 46 as is more clearly shown in Fig. 13 which is an enlarged detail view. Fig. 13 also shows the construction of the separator partitions disposed between the several pairs of vibrating wires. Each partition is formed of two sheets 53 of mica and an intermediate sheet 54 of metal, shaped as shown. The metal sheet 54 conforms to the shape of the body of the mica sheets 53, but is not provided with feet 56, as are the mica sheets, for adapting the assembly to slight irregularities in the glass shell 57, which encloses the entire apparatus. The purpose of the metal sheet 54 is to provide an equipotential surface intermediate adjacent sections to prevent interference in the operations within either section.

The cathode 38 is mounted through apertures in the separators below the vibrating wires 40. The anodes 39 are supported on conductors 58 which are sealed in and extend through the glass press 59. The anodes 39 are placed in position between the separators, as shown more clearly in Fig. 12 which is a foreshortened vertical longitudinal sectional view. The cathode is supported in a glass press 60, through which one of the supports is continued to make connection to the cathode. Connections 61 to the heater element 62 are also made through the press 60, as is shown in Fig. 11 which is a horizontal sectional view.

Fig. 14 is a side elevational view partly in section of a complete frequency separator and picture producing means. The vibrating wire frequency separating apparatus substantially as shown in Figs. 10-13 is incorporated within an evacuated vessel 74 with cathode ray apparatus. A series of secondary electron emitting elements 67 is substituted for the series of anodes 39 provided in the apparatus shown in Figs. 10-13, and a modified form of separator partition, is employed. Referring to Fig. 14, and to Fig. 15, which is a foreshortened vertical longitudinal sectional view, it may be seen that the secondary electron emitting elements, or first anodes are supported at an angle on a pair of transversely extending rods 68 and 69, rod 69 continuing through the glass seal and providing a common connection to all the elements 67. Slots are provided in the separator partitions 70 to accommodate the rods 68 and 69. A series of second, or guide anodes 71, is provided aligned with the emitting surfaces of the first anodes 67; and a pair of deflection plates 72 and 73 extend transversely the length of the apparatus. The arrangement and operation of the secondary electron emitting elements, the guide anodes, and deflection plates is identical to that described in connection with the cathode ray picture tube in my copending application, Serial No. 733,300. The electrons emitted by the cathode are attracted to the first anodes 67, the quantity received by each being regulated by the action of the corresponding pair of vibrating wires. The elements 67 produce streams of electrons by secondary electron emission, which streams are individually attracted and guided into rays by the corresponding guide anodes 71. The elements 71 are electrically connected together and charged at a common higher positive potential than the secondary electron sources 67. Thus, all the electron rays, no matter of what intensity, have the same velocity after leaving the anodes 71, and are, therefore, subject to the same deflections under the influence of a common potential. The beam formed by these rays is deflected by the varying charges on the common deflection plates 72 and 73 and thus sweeps over the screen at the end of the vessel 74, reproducing the scene scanned at the transmitter.

Fig. 16 shows a vertical sectional view of electron tube adapted for use as an amplifying tube in the system of my invention. A common cathode electrode, 75, is supported centrally of the glass envelope 76. A heater element, 78, is disposed within the cathode. A multiplicity of control grid and anode electrodes, designated generally by reference characters 79 and 80, respectively, is provided. Between each set of control grid and anode electrodes is provided a separator partition consisting of two discs of mica, designated by 81, and an intermediate disc 82 of metal. The metal disc is provided with a larger aperture 82a in the center than are the two mica discs, the apertures 81a in which are substantially the diameter of the cathode 75. The mica discs are adapted to be spaced along the length of the cathode electrode, and the metal disc, by virtue of its larger aperture, can be supported between the mica discs insulated from the cathode. The metal discs 82 are provided as equipotential surfaces to serve as shields between the compartments. A common screen grid electrode 83 is provided of such shape that it envelops the anode electrodes. A slot 83a in the outer surface of the screen grid permits connections to be made to the anode electrodes 80. Horizontally disposed slots 83b are provided in the screen grid electrode 83 to permit the insertion of the mica and metal separator partitions. A space 84 is provided, where the screen grid bends back to envelop the anodes, for the entrance of the connections to the control grids.

Fig. 17 is a cross-sectional view of the tube shown in Fig. 16 and shows the glass press forms which seal the connections to the several anode and control grid elements.

Fig. 17a is an enlarged vertical sectional view on an axis displaced 90° with respect to the axis of the vertical section shown in Fig. 16. Fig. 17a illustrates particularly the disposition of the elements in the sections of the multi-section amplifier tube 76, showing the heater 78, the cathode 75, the control grid 79, the anode 80, and the screen grid 83 in assembled relation; and showing also the mica discs 81 and the metal disc 82 arranged as a shielding partition between the sections, the mica discs being disposed on either side of the metal disc and insulating it from the electrodes. The manner in which the partitions are supported in the slots 83b in the screen grid 83 is apparent from Fig. 17a.

Fig. 18 is a cross-sectional view showing a modified form of the electron tube of my invention. Means are shown in Fig. 18 whereby the connections to the several grid electrodes are brought out in a staggered arrangement thereby lessening interterminal capacity effects. Fig. 19 is a perspective view of the elements of the electron tube shown in Fig. 16 shown in disassembled relation.

Fig. 20 is a side elevational view of picture producing apparatus of my invention which includes a multiplicity of light units 85, mounted in a vertically disposed wall 86, perforated to receive mounting studs on the light units, and held in a supporting bracket 87.

Fig. 21 is a plan view, Fig. 22 a side view; and Fig. 23 a cross-sectional view of one form of light unit employed in the picture producing apparatus. Each of the light units of this construction comprises a cylindrical member having an inner bore 89 shaped to provide an elliptical reflector. At the focus of the reflector is positioned a source of light which comprises a glass tube 90 filled with a gas and having a pair of electrodes 91 and 92 mounted in either end, the electrode 91 being connected with the cylindrical member and the electrode 92 being insulatingly connected through a wire to one of the modulated signal circuits. A stud 93 of decreased diameter extends from the rear of the cylindrical light unit, and is provided with a circumferential groove 94. The stud 93 is adapted to fit into a hole in the perforated wall 86, and the unit secured therein by a clip 95 engaging the circumferential groove 94. The screen, 98, when associated with light units of this type includes the points which are the conjugate foci of the foci of the elliptical reflectors in the light units.

A modified form of light unit, shown in elevation in Fig. 24, employs a system of lenses 96 and 97 in place of the elliptical reflector of the unit shown in Figs. 21–23. This lens system operates to focus the light from the individual light source on the screen, 98, the first lens, 96, paralleling the rays from the source, which is similar to that already described, and the second lens, 97, focusing the parallel rays into a spot on the screen.

Fig. 25 is a partial front view of the bank of light units and shows the staggered formation in which they are disposed, which facilitates the locating of the several spots of light closely adjacent each other so as to present a smooth line of blended yet distinctly variable spots of light to the eyes of the observers.

Referring again to Fig. 20 and to Fig. 26, which is a horizontal sectional view taken on line 26—26 of Fig. 20, it is seen that the perforated supporting wall 86 is formed in an arc to further facilitate the production of a narrow line of light. The bank of light units is adapted to pivot in ball bearing supports 100 and 101 so that the line of light sweeps across the screen 98 in a direction perpendicular to its length. Since the center of the arc of the bank of light units must lie on the screen for every position of the bank in pivoting, the screen is, therefore, also formed in an arc, the center of which lies in the center of the pivot.

A spiral spring 102, mounted on the shaft 103 immediately above the lower ball bearing 101, is adaped to centralize the light beam projected by the light units 85 on the screen 98, and tensioned so as to coact with the intertia of the pivoted structure to cause oscillation of the structure at substantially the scanning frequency. The free end of the spiral spring 102 is anchored on the pin 110 set in the base of the main structure 112 of the apparatus. Immediately above the spiral spring, mounted on the shaft 103, and extending normal to the arcuate bracket 87, is an actuating rod 104, supported on the end of which is a coil 105 adapted to swing between pole faces 106 and 107 of the core structure 108. Mounted on the poles of the core structure 108 are a pair of magnetizing windings 109 and 109' energized from a source of direct current. The swinging coil 105 carries the scanning component of the television signal current and produces thereby a magnetic field which reacts on the stationary magnetic field produced by the field coils 109 and 109' and causes the coil 105 to oscillate and correspondingly oscillate the bank of light units, moving the beam of light across the screen. The natural period of oscillation of the pivoted structure corresponding substantially to the frequency of the scanning current, the comparatively large mass of the pivoted structure is easily maintained in oscillation. The insulated leads from the light units are combined into a cable 114 which, together with the common lead from one side of each unit is fixed to the frame 112 adjacent the upper pivot connection. Insulating pieces 115 are disposed between one of the arcuate brackets 87 and the shaft 103 and the other bracket 87 and the stud 116 which pivots in the upper ball bearing 100.

Fig. 27 is a schematic diagram showing one arrangement of apparatus in a television receiving system of my invention. Condenser 111, connected to the output circuit of the conventional television receiver, offers a high impedance to currents of scanning frequency but a low impedance to currents of light modulated carrier frequency while the choke coil 117 offers low impedance to currents of scanning frequency and high impedance to the light modulated carrier frequency currents. The output of the condenser branch of this filter circuit is connected, in this arrangement, to vibrating reed frequency separator units 118, of a type shown in Figs. 1–9, wherein the several frequency components of the picture current are separated. The output of the vibrating reed units is connected, in Fig. 27, to the picture producing apparatus shown in Figs. 20–26, and here designated by reference character 119. The scanning component of the current is conducted through an amplifying tube 120, to the oscillating coil in the picture producing apparatus. Means for adjusting the amplitude and the synchronism of this current are provided at 121 and 123, respectively.

Fig 28 shows an arrangement employing the electrically resonant frequency separator circuit described in my copending application Serial No. 733,300 and the picture producing apparatus 119, herein described, connected to the output thereof in place of the picture tube shown in my copending application.

Fig. 29 shows a system of my invention similar to that described in connection with Fig. 27, but including the amplifying tube shown in Figs. 16–19, and designated here at 124.

Fig. 30 shows an arrangement employing the vibrating reed frequency separating units 118 associated with the cathode ray picture tube 125 described in detail in my copending application Serial No. 733,300. Amplifying tube 120, and amplitude and synchronism adjusting means 126 and 127, respectively, are provided for adjustment of the synchronizing current.

Fig. 31 shows the vibrating wire frequency separator apparatus, shown in Figs. 10–13, and designated here by reference character 128, associated with the picture producing apparatus 119. The scanning current is conducted to the oscillating coil, as described in connection with Fig. 27.

Fig. 32 shows the receiving system which employs the vibrating wire frequency separator apparatus 128 in connection with the cathode ray picture tube 125. The scanning current is conducted to the deflecting plates, as described in connection with Fig. 30.

Fig. 33 schematically illustrates the circuit connections to the combined frequency separator-picture tube described in Figs. 14 and 15, and here designated by reference character 129. The first anodes 67 are maintained at a desired positive potential by a source of potential 130 shown as a battery. The second or guide anodes 71 are maintained at a still higher positive potential by additional source of potential 131. The deflection plates 72 and 73 are maintained at substantially the same potential as the guide anodes 71 by means of the connection 132. Amplifying tube 120 and amplitude control means 134 are provided in the circuit of the synchronizing current which connects to the deflection plates 72 and 73. The common grid bias is provided by a source of potential 135 and connects to the frame which supports all the vibrating wires.

Fig. 34 shows the system of my invention which employs the vibrating wire frequency separator 128, and the picture producing apparatus, 119, as shown in Fig. 31, but also including the amplifying tube 124 connected between the frequency separator apparatus and the picture producing apparatus.

Fig. 35 shows the vibrating reed frequency separator units 118, associated with the amplifying tube 124, and the cathode ray picture tube 125, in still another arrangement possible with the apparatus of my invention.

Figs. 27-35 illustrate a number of television receiving systems which can be assembled with the apparatus of my invention. Though all of the systems are operative, some will be found more feasible than others, in view of the development of the different apparatus. A system employing the vibrating reed frequency separator units, the amplifying tube, and the picture producing apparatus of my invention is a preferred form, but I desire that it be understood that modifications may be made by those skilled in the art and that I intend no limitations upon my invention other than may be imposed by the scope of the appended claims.

What I claim as new and desire to secure by Letters Patent of the United States is as follows:

1. In a television receiving system for cooperation with a television transmitting system producing a complex signal current comprising a plurality of simultaneously modulated different frequency currents and a synchronizing current, object reproducing apparatus comprising a vibratible wire frequency separator system which comprises a plurality of wire elements selectively responsive to the different frequencies in said complex signal current, a cathode electrode, a series of secondary electron emitting elements constituting first anode electrodes, said vibratible wire elements being disposed between said cathode and said first anode electrodes and selectively operative to vary individually the flow of electrons to each of said first anode electrodes, said object reproducing apparatus further comprising a series of second anode electrodes constituting guide anodes and effective to form the electrons emitted by corresponding secondary electron emitting elements into a beam, deflecting plates energized by the synchronizing current in said complex signal current and operative to oscillate said electron beam within a predetermined arc, a fluorescent screen disposed in the path of said electron beam and effective to convert the electron energy into light energy.

2. In a television receiving system for cooperation with a television transmitting system producing a complex signal current comprising a plurality of simultaneously modulated different frequency currents and a synchronizing current, vibrating wire frequency separating apparatus which comprises a frame structure, an electromagnet comprising a laminated core and field and main windings supported by said frame structure, pole pieces in said laminated core, a pair of parallel disposed bars forming part of said frame structure, a plurality of vibratible wire elements supported between said bars, means for tuning pairs of said wire elements for different frequencies of vibration, whereby said wire elements constitute means selectively responsive to the different frequencies in said complex signal current, said tuning means including wedge members adapted to be mounted between said wire elements and one of said bars, said wedge members being sealed in the desired position, damping magnets supported from said frame structure, pole pieces on said damping magnets embracing said pairs of wire elements, means controlled by the action of said selectively responsive wire elements for producing a plurality of separate currents varying in accordance with the modulations of the different frequency currents in said complex signal current, and an evacuated glass envelope enclosing said vibratible wire frequency separating apparatus.

3. In a television receiving system of the class described, vibrating wire frequency separator apparatus as described in claim 2, in which the means for producing a plurality of separate modulated currents includes a cathode electrode and a plurality of anode electrodes supported in said glass envelope, one of said pairs of tuned wire elements aligned with each of said anode electrodes, said wire elements being disposed between said cathode and said anode electrodes and selectively operative to vary individually the flow of electrons to each of said anode electrodes, and separator partitions adapted to form shielded sections each containing a portion of the common cathode, one of said pairs of vibratible wire elements and an anode electrode, each of said partitions composed of a pair of mica sheets and a metal sheet maintained between said mica sheets, said partitions being apertured to pass the common cathode electrode, the apertures in the metal sheets being larger than those in the mica sheets.

4. In a television receiving system of the class described, vibrating wire frequency separator apparatus as described in claim 2, in which the means for producing a plurality of separate modulated currents includes a cathode electrode mounted in said glass envelope, a series of secondary electron emitting elements, a pair of rods sealed in said glass envelope and supporting said series of secondary electron emitting elements, one of said pairs of tuned wire elements aligned with each of said secondary electron emitting elements, said wire elements being disposed between said cathode and said secondary electron emitting elements and selectively operative to vary individually the flow of electrons to each of said secondary electron emitting elements, said evacuated glass envelope also enclosing a series of guide anode electrodes, a second pair of rods sealed in said glass envelope and supporting said guide anodes in alignment with the emitting surface of said secondary electron emitting elements, a pair of deflection plates, additional pairs of rods sealed in said glass envelope and supporting said deflection plates in position embracing the beam of electrons formed by said guide anodes, and a plane area formed in said glass envelope in the path of said beam of electrons, said plane area being provided with a coating which becomes luminous under the impact of said beam of electrons.

5. A television receiving system of the class described, comprising in combination vibrating wire frequency separator apparatus and multiple cathode ray picture producing means, an evacuated glass envelope enclosing said frequency separator apparatus and said picture producing means, said vibrating wire frequency separator apparatus being mechanically operative to effect electrical modification of the action of said cathode ray picture producing means.

6. Electromechanical frequency selective apparatus comprising a plurality of vibratible wire elements selectively operable at different frequencies, electromagnetic means for actuating said elements energized by a complex modulated signal current including subcarrier components of different frequencies, and means controlled by the action of said selectively operable vibratible wire elements for producing a plurality of separate currents varying in accordance with the modulations of the different frequency components in said complex signal current; the last said means including a cathode source of electrons and a plurality of anode electrodes, said wire elements being disposed between said source of electrons and said anode electrodes and selectively operative to vary individually the flow of electrons to each of said anode electrodes, together with means for applying a bias potential in common to the vibrating wire elements.

7. Electromechanical frequency selective apparatus comprising a plurality of vibratible wire elements selectively operable at different frequencies, electromagnetic means for actuating said elements energized by a complex modulated signal current including subcarrier components of different frequencies, and means controlled by the action of said selectively operable vibratible wire elements for producing a plurality of separate currents varying in accordance with the modulations of the different frequency components in said complex signal current; the last said means including a cathode source of electrons and a plurality of anode electrodes, said wire elements being disposed between said source of electrons and said anode electrodes and selectively operative to vary individually the flow of electrons to each of said anode electrodes, together with means for applying a bias potential in common to the vibrating wire elements; said anode electrodes constituting secondary electron emitting elements adapted to form a flat beam of electrons comprising a ray from each of said anode electrodes, and plate members disposed above and below said beam and adapted to be energized by an alternating potential for deflecting said beam.

WALTER SOLLER.